United States Patent [19]

Heckel et al.

[11] Patent Number: 4,486,856

[45] Date of Patent: Dec. 4, 1984

[54] CACHE MEMORY AND CONTROL CIRCUIT

[75] Inventors: George Heckel; Gary B. Ollendick, both of Mundelein, Ill.

[73] Assignee: Teletype Corporation, Skokie, Ill.

[21] Appl. No.: 376,453

[22] Filed: May 10, 1982

[51] Int. Cl.[3] .............................................. G06F 13/00

[52] U.S. Cl. .................................... 364/900; 340/798; 340/799

[58] Field of Search ... 364/200 MS File, 900 MS File; 340/798, 799

[56] References Cited

U.S. PATENT DOCUMENTS

| | | | |
|---|---|---|---|
| 4,051,457 | 9/1977 | Inose et al. | 340/146.3 MA |
| 4,167,782 | 9/1979 | Joyce et al. | 364/200 |
| 4,169,284 | 9/1979 | Hogan et al. | 364/200 |
| 4,195,340 | 3/1980 | Joyce | 364/200 |
| 4,197,580 | 4/1980 | Chang et al. | 364/200 |
| 4,208,716 | 6/1980 | Porter et al. | 364/200 |
| 4,338,599 | 7/1982 | Leininger | 340/798 X |

*Primary Examiner*—Raulfe B. Zache
*Attorney, Agent, or Firm*—W. K. Serp

[57] ABSTRACT

A cache memory 30 having a thirteen bit word length is illustrated for storing more than one data word read from a system memory 80 having an eight bit word length and providing the stored words to a video display 18 on a reoccurring basis. The cache memory 30 has a storage capacity sufficient to store the words for one row of display text characters. Two system memory bytes are concatenated by a latch 74 and storage buffer 96 prior to writing into the cache memory 30. After the scanning of the first word of the last scan line in the current cathode ray tube (19) display text row, the first word of the new text row is written into the cache memory (30) from the system memory (80). The write procedure is completed before the last word of the new text row is read from the cache memory 30 to the cathode ray tube display 19 during the writing of the first scan line of the new text row.

11 Claims, 4 Drawing Figures

FIG. 2
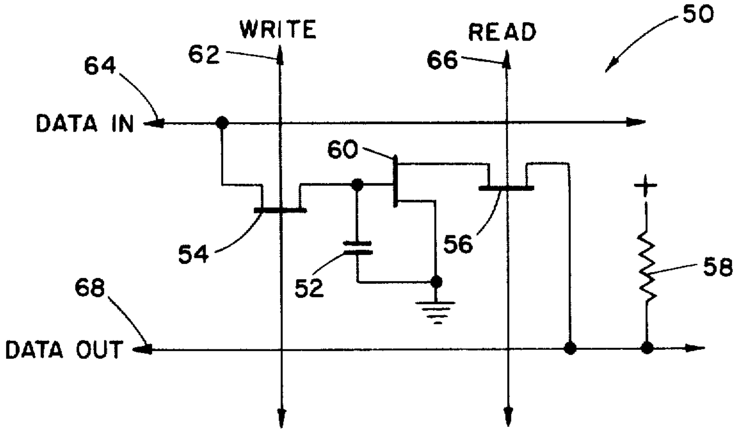
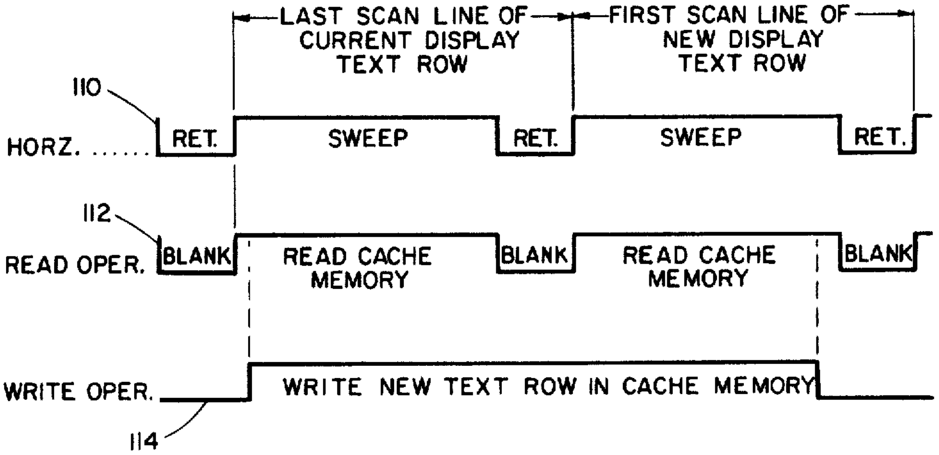
FIG. 3

CACHE MEMORY AND CONTROL CIRCUIT

DESCRIPTION

1. Technical Field

This invention relates to an improved cache memory and control circuit for a raster scanned cathode ray tube display.

2. Background Art

In a raster scanned cathode ray tube, display code representations, e.g. ASCII code words, are stored in a cache memory which is of sufficient length to hold a text row of printed and non-printed characters. Typically, a text row consists of 80 character areas, and in a raster scan display, the characters are displayed by presentation of corresponding matrix patterns of dots in a character area. A typical matrix is seven dots wide and nine dots high. In such displays, it is necessary to translate the character codes to obtain the corresponding dot display information for each scan line of a text row. For example, if a seven by nine matrix is used, nine successive scan lines will each supply corresponding horizontal portions of each of the characters of the text row. Accordingly, in the case of a seven by nine matrix, the data words in the cache memory will each be translated nine times for the corresponding nine scan lines in order to synthesize the characters of the text row. Successive rows of text are separated vertically by two or more blank scan lines.

The use of a cache memory permits a control processor to carry on other system functions while the cache memory provides data for the display control circuitry.

A variety of cache memory and control circuits are used in prior CRT display apparatus; however, such known arrangements either incur operating limitations or are unduly complicated. For example, certain known CRT display apparatus employ two cache memories which are used alternately for successive display scan lines. While such arrangements permit complete freedom of display on all regions of the display tube, the use of two independent memories with independent addressing unduly complicates the circuitry.

Certain other known apparatus utilize a single cache memory which is loaded with new information during one or more of the display scan lines which are utilized to provide vertical space between successive text rows. In such arrangements it is not possible to display any information in the space between two text rows as may be required in the display of graphics intermingled with the text material.

The data characters to be displayed often include character enhancements or attributes such as reverse video, increased intensity for selected characters, or display blanking of control codes. Such attribute information may be in the form of field codes or individual character codes. When field codes are used, an attribute data word stored in the main memory is sent to the cache memory preceding the character word or words which are to be displayed. After the character word or words are sent to the cache memory, a second attribute word is sent to the cache memory. Thus, during display, the attribute word sent from the cache memory to the display switches on the selected attribute function of the display. The next character word sent to the display is enhanced and thereafter the cache memory sends a second attribute word to the display circuitry which switches off or changes the attribute function. In such a system, the display shows a space when an attribute code is being received from the cache memory thus preventing the application of different attributes to adjacent display characters. When character codes are used, the attribute information is in the form of additional bits appended or concatenated to the character bits and sent as an enlarged data word to the display. The attribute bits of the enlarged data word switch on the attribute function of the display only during the display of the representative character, and thus, adjacent display characters may be shown with different attribute characteristics.

Currently available memory is generally configured in eight bit words or bytes. Eight bits are sufficient to provide a unique coding for all ASCII characters. In character code systems, an attribute word is stored in the system memory in the form of a data byte preceding or following the associated character byte. Selected bits of the attribute byte are concatenated to the character byte before being stored in the cache memory so that an enlarged cache word will be sent from the cache memory to the display containing both character and attribute information. Thus, for each word stored in the cache memory, two bytes are read from the system memory, concatenated and written into the cache memory at a single storage location.

DISCLOSURE OF THE INVENTION

In accordance with this invention, a cache memory and control circuit is provided for coupling a system memory for storing a plurality of memory data words with a video display circuit for displaying visual representations of selected memory data words. A cache memory is included for storing a plurality of cache data words of sufficient number for one text row of visual representations. The cache memory comprises independent means for reading and means for writing for concurrently, selectively accessing different portions of the cache memory. The reading means is arranged to sequentially read from the cache memory the cache data words of a first text row staring with the first cache word and to transfer the cache data words to the video display circuit once for each scan line of the video representations of a text row comprising a plurality of scan lines. The writing means is arranged to sequentially obtain from the system memory and to write into the cache memory the cache data words of the next subsequent second text row starting with the first cache data word of the second text row and ending with the last cache data word of the second text row. The circuit also includes means for enabling the writing means immediately after the reading means has read the first cache data word of the first text row in the implementation of the display of the last scan line of the first text row.

THE DRAWINGS

FIG. 2 is a partial schematic diagram of a portion of a component of the apparatus illustrated in FIG. 1;

FIG. 3 is a timing diagram illustrating the operation of a portion of the apparatus illustrated in FIG. 1.

DETAILED DESCRIPTION

Figure 1:
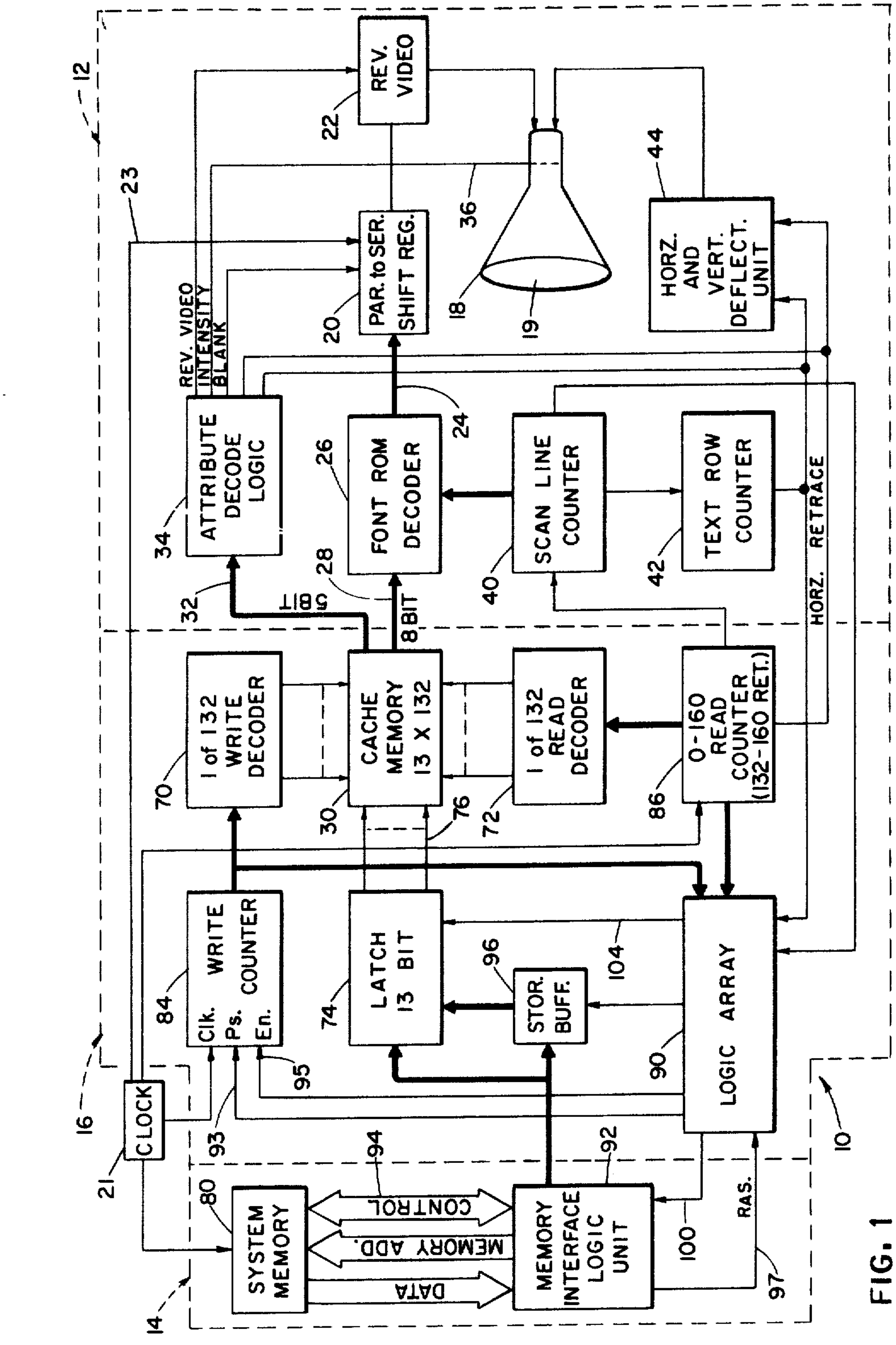
FIG. 1 is a schematic block diagram of an apparatus including a cache memory and control circuit including certain features of this invention.

With reference to FIG. 1, a circuit 10 includes a video display section 12, a system memory section 14 and a cache memory and control section 16 which provides intermediate storage between the system memory section 14 and the video display section 12. The video display section 12 includes a cathode ray tube 18 having a display screen 19 with a display format accommodating 132 characters in each of 24 text rows. It will be appreciated that other display formats may be used without departing from the scope and spirit of the invention. The character information sent to the cathode ray tube 18 is provided at the output of a parallel to serial shift register 20 through a selectively controlled reverse video unit 22. Information within the shift register is stepped by a high frequency clock signal from a system clock 21 via line 23. Input to the shift register 20 is via an eight line buss 24 from a front ROM decoder 26 which is addressed by an eight level output 28 from a cache memory 30. An additional five level output 32 from the cache memory 30 supplies character attribute information to an attribute decoder 34. The output of the attribute decoder 34 controls the reverse video unit 22, the shift register 20 and an intensity control electrode 36 of the cathode ray tube 18. The attribute decoder 34 selectively blanks the output of the shift register 20 thereby blanking selected character positions on the display screen 19. The control signal fed to the reverse video unit 22 selectively inverts the character information passing from the shift register 20 to the cathode ray tube 18 thereby resulting in a reverse image character being displayed. The third control signal to the control element of the cathode ray tube 36 selectively changes the intensity of the electron beam within the cathode ray tube.

The video display section 12 also includes a scan line counter 40 providing a multilevel output signal to the font ROM decoder 26 indicating the particular scan line of the text row being written upon the cathode ray tube display screen 19. Thus, the output of the font ROM decoder 26 is determined by the information read from the cache memory 30 and the particular scan line being written on the display screen 19. A selected output of the scan line counter 40 is fed to a text row counter 42 which in turn provides a signal to a horizontal and vertical deflection unit 44 which controls the horizontal and vertical deflection of the cathode ray tube 18. For additional information concerning the generation of characters on a cathode ray tube screen, the reader's attention is directed to U.S. Pat. No. 4,156,238 issued to Glasson et al., on May 22, 1979, entitled "Display Apparatus Having Variable Text Row Formating" and U.S. Pat. No. 3,868,673 issued to Mau, Jr. et al., on Feb. 25, 1973, entitled "Display Apparatus Including Character Enhancement".

The cache memory 30 is capable of simultaneous read and write operations. A memory cell 50 having such capability is illustrated in FIG. 2. A plurality of cells, such as the cell 50, are arranged in a matrix configuration in the cache memory 30. The storage element of the memory cell 50 is a capacitor 52. The cell 50 includes a write switching transistor 54 and a read switching transistor 56. One electrode of the read switching transistor 56 is connected to a pull up resistor 58. The cell 50 also includes an isolation transistor 60 which allows the charge on the capacitor 52 to be sampled through the read switching transistor 56 without substantially discharging the capacitor 52. A high potential on a write line 62 connected to the gate of the write transistor 54 allows the potential level on a data in line 64 to charge the capacitor 52 through the write switching transistor 54. Similarly, a high potential on a read line 66 connected to the gate of the read switching transistor 56 allows a data out line 68 to reach a potential determined by the gate of the isolation transistor 60. The potential on the gate of the isolation transistor being determined by the charge on the capacitor 52.

The illustrated cache memory 30 is configured to accommodate 132 thirteen bit words. As will subsequently be further considered, eight bits of each word provide character information and the remaining five bits provide attribute information. The cache memory 30 is addressed for writing by a one of 132 bit write decoder 70 and is addressed during reading by a one of 132 bit read decoder 72. Input data to the cache memory 30 is provided by a thirteen bit latch 74 through a multilevel buss 76. Thus, data placed in the thirteen cache memory cells selected by the read decoder 72 appear on cache character 28 and attribute 32 busses providing information to the font ROM decoder 26 and the attribute decoder 34 respectively while the data on the output lines 76 of the latch 74 is stored in the thirteen cache memory cells selected by the write decoder 70. As will subsequently be considered in greater detail, a system memory 80 forming part of the system memory section 14, being of conventional construction, provides a plurality of eight bit bytes. Thus, one cache memory 30 word is concatenated from two system memory 80 bytes. The timing of the circuit 10 is provided by the clock 21 which supplies timing signals to the system memory 80, a cache write counter 84 and a cache read counter 86. Two system clock cycles are required to write a single thirteen bit word into the cache memory 30 from the system memory 80 while the read function of the cache memory 30 utilizes one system clock cycle for each word. The write counter 84 feeds a binary address to the write decoder 70 and to a logic array 90. For a more detailed discussion of logic arrays, the reader's attention is directed to U.S. Pat. No. 4,132,979 issued on Jan. 2, 1979, to R. H. Heeren entitled "Method and Apparatus for Controlling A Programmable Logic Array". Similarly, the read counter 86 supplies a binary address signal to the read decoder 72 and to the logic array 90 as well as control signals to the scan line counter 40 and a horizontal retrace signal to the horizontal and vertical deflection unit 44.

The system memory section 14 includes a system memory interface unit 92 which interfaces the system memory 80 via a system buss 94 to the latch 74 and a storage buffer 96. Communication with the system memory 80 is via the system buss 94 with memory address, data and control signals passing between the system memory 80 and the interface logic unit 92. To more fully appreciate the operation of the illustrated circuit, certain features of the system memory should be understood. As mentioned, the system memory 80 is arranged to store information in eight bit words (bytes). Commercially available integrated circuit packages comprising this dynamic memory have multiplexed address inputs. That is, a single set of input pins carry both the row and column address signals to the circuitry within the integrated circuit package. Assignment of the incoming signals on the pins to row or column addressing circuitry is made by a row address (RAS) or a column address (CAS) strobe signal fed to one pin of the package. Memory implemented with such commercially available integrated circuits can be accessed in a page mode. In the page mode, the RAS signal is followed by a sequence of CAS signals, each addressing a unique memory word location. Interspersed between a series of CAS signals is a RAS signal provided for the purpose of addressing a new memory row or refreshing a prior memory row address. Thus, the data read from the system memory 80 is available for each CAS signal with the RAS signals providing no new data output.

As previously mentioned, data is read from the cache memory 30 during each cycle of the clock 82 with no new output during the horizontal and vertical retrace time intervals of the display. The coordination of the read and write functions of the cache memory 30 and the read function of the system memory 80 are provided by the logic array 90 the operation of which is illustrated in the logic flow diagram of FIG. 4. As previously mentioned, one input to the logic array 90 is from the multilevel output of the read counter 86 which counts from 0 to 160. During counts 1 to 132, data is read from the cache memory 30 to the video display section 12, i.e. one thirteen bit word is read from the cache memory 30 to the video display section 14 during each clock cycle. Counts 132–160 correspond to the horizontal retrace interval of the cathode ray tube 18 beam. Additionally, the logic array 90 receives input from the scan line counter 40 and a vertical retrace signal from the text row counter 42 which is also sent to the horizontal and vertical deflection unit 44. The multilevel output from the write counter 84 is also fed to the logic array 90 and the logic array 90 feeds preset and enble signals to preset 93 and enable 95 inputs of the write counter 84 for synchronization purposes. The RAS signal from the system interface logic unit 92 is fed via line 97 to the logic array 90. The logic array 90 provides a Direct Memory Access (DMA) signal to the memory interface logic unit via line 100 which takes control over the system buss 94 and directs the transmittal of data from the system memory 80 to the cache memory and address section 16.

Eight bits of parallel data from the system memory 80 pass via the buss 94 to the storage buffer 96 which is capable of storing only five attribute bits thus ignoring or stripping off the remaining three bits of the eight bit system memory word. Subsequently, eight parallel character bits of information appear at the input of the thirteen bit latch. In response to a signal from the logic array via line 104, the thirteen bits are stored in the latch 74 and made available to the cache memory 30. In this manner, two successive eight bit words from the system memory 80 are concatenated into a single thirteen bit word which is stored in the cache memory 30.

Upon energization, an initialization routine (not shown) fills the cache memory 30 from the system memory 80 with the data words of the first display text row. The words stored in the cache memory 30 are fed to the font ROM 26 once for each scan line of the text row. Immediately during the scanning of the last scan line of the current text row and after readout from the cache memory 30 of the first character of the current text row, the system memory 80 is accessed and data from the system memory 80 is written into the cache memory 30. During the remainder of the last scan line of the presently displayed text row, as each character is read from the cache memory 30 to the font ROM 26, the storage location in the cache memory 30 occupied by the word sent to the font ROM 26 is updated with a new thriteen bit word created by combining two eight bit words from the system memory 80. As previously mentioned, at least two cycles of the clock 82 are required to write one new thirteen bit word into the cache memory 30 while only one clock cycle is required to read each word from the cache memory 30. It is apparent that less than half of the new text row can be written into the cache memory 30 during the time interval which expires during readout of the currently displayed text row from the cache memory 30. The cache memory 30 is also updated during the horizontal retrace time of the cathode ray tube 18 as well as during the readout of the new text row words from the cache memory 30 during the first scan line of the new text row from the cache memory 30. Since the first words of the new text row were the first words written into the cache memory 30, these words are the first words of the new text row sent to the font ROM decoder 26 and the attribute decoder 34 during the scanning of the first scan line of the new text row. Thus, the time interval available for writing the words for the new text row into the cache memory 30 is greater by substantially the horizontal retrace time than twice the time available during readout of the words of a text row from the cache memory 30. This additional time interval is used to accommodate the RAS strobe of the system memory 80. This timing relationship is particularly illustrated in FIG. 3 wherein the horizontal retrace timing 110 is shown in relation to cache memory, read 112 and write 114 operations. As illustrated, the cache memory 30 write operation 114 for writing the words of a new text row starts during the last scan of the current text row and after the readout of the first word of the current text row. The writing into the cache memory 30 of the first word of the new text row from the system memory 80 starts and continues until all of the words of the new text row are written into the cache memory 30.

Figure 4:
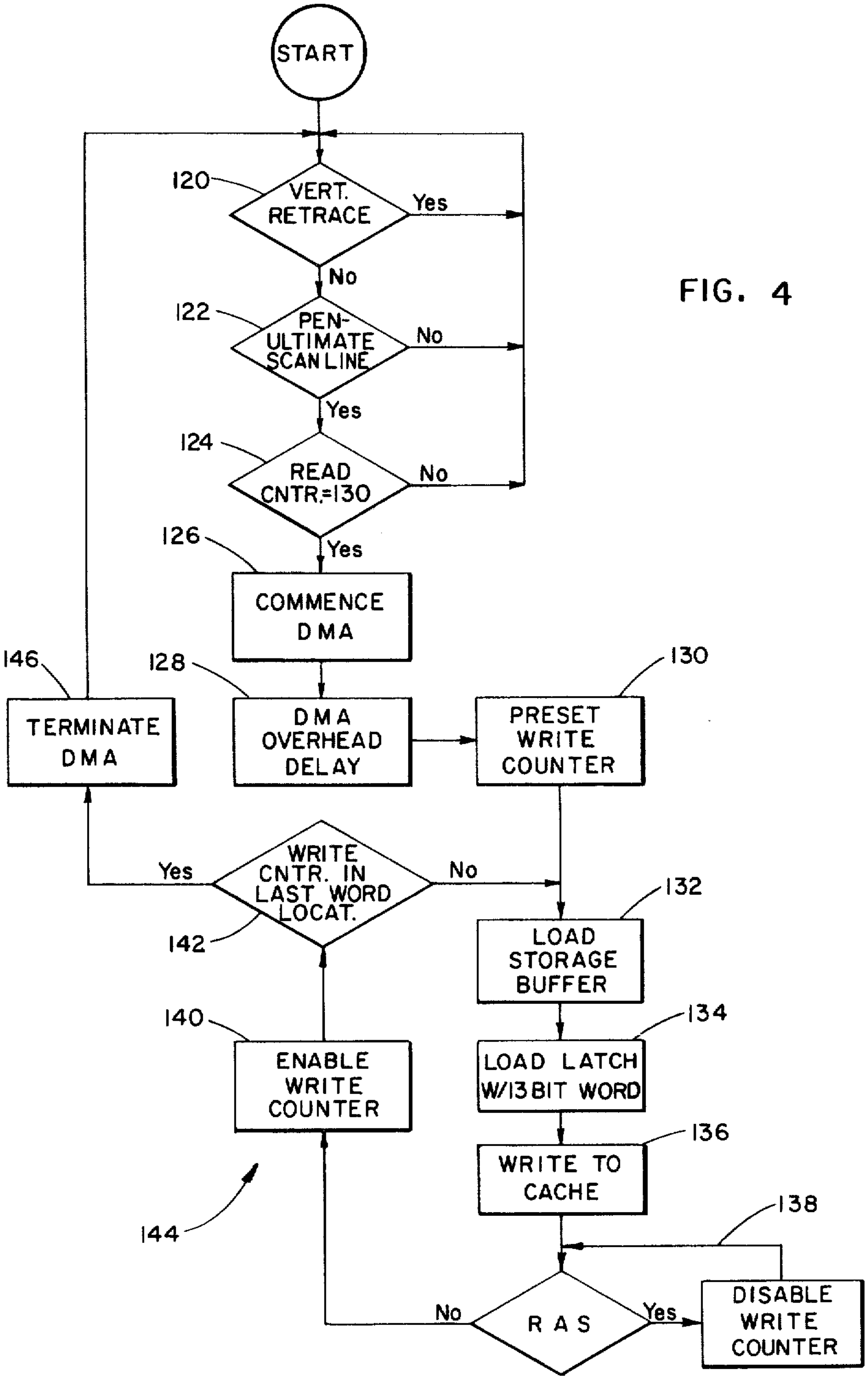
FIG. 4 is a logic flow chart of the operation of a component of the apparatus of FIG. 1.

The flow diagram of FIG. 4 more particularly illustrates the operation of the circuit of FIG. 1 as controlled by the logic array 90. The flow diagram starts with a decision 120 as to the presence of the vertical retrace signal with a negative determination leading to the next decision 122 as to whether the penultimate scan line is being read from the cache memory 30. An affirmative determination falls through to a decision 124 as to whether the read counter has reached a count of 130. These three conditions occur at the start of the horizontal retrace of the cathode ray tube 18 beam preceding the start of the last scan line of the current text row and are selected to provide adequate time for the memory interface logic unit 92 to access the system memory 80. After the DMA signal occurs, i.e. operation 123, a delay 128 is introduced to allow establishment of the system memory access and the write counter 84 is preset to a zero count 130 which causes the write decoder 70 to address the location of the first word to be stored in the cache memory 30. The storage buffer 96 is loaded at operation 132 with five of the eight bits of the byte received from the system memory 80. The next eight bit byte from the system memory 80 is concatenated in the latch 74 with the five bits in the storage buffer 96 as operation 134, and the full thirteen bits are written as operation 136 into the cache memory 30 in a single thirteen bit word location. The write procedure is interrupted in the presence of a RAS signal by the decisional loop 138. In the absence of a RAS signal, the write counter 84 is incremented 140 and a decision 142 is made as to whether the write counter 84 is directing the write decoder to address the last word location in the cache memory 30, i.e. whether all of the words in the new text row have been stored in the cache memory 30. A negative determination continues a write loop 114 until the last word of the new text row has been written into the cache memory 30. Thereafter, the DMA to the system memory is terminated 146 and the logic array 90 returns to the start of the flow diagram.

A cache memory and control circuit 16 have been described which provide intermediate storage between a system memory 80 and a video display circuit 12. The cache memory and control circuit 16 includes a single cache memory 30 having a capacity sufficient to accommodate one text row of data. Although the invention has been shown and described with reference to a preferred embodiment thereof, it will be understood that various changes in form and detail may be made without departing from the scope and spirit of the invention.

What is claimed is:

1. A cache memory and control circuit (16) for coupling a system memory (80) for storing a plurality of memory data words with a video display circuit (12) for displaying visual representations of selected memory data words comprising:

a cache memory (30) for storing a plurality of cache data words of sufficient number for one text row of the visual representations; said cache memory (30) comprising independent means (72, 86, 90) for reading and means (70, 84, 90) for writing for concurrently, selectively accessing different portions of said cache memory (30);

said reading means (72, 86, 90) arranged to sequentially read from said cache memory (30) the cache data words of a first text row, starting with the first cache word, and to transfer said cache data words to said video display circuit (12) once for each scan line of the video representation of said first text row, each video representation of a text row comprising a plurality of said scan lines;

said writing means (70, 84, 90) arranged to sequentially obtain from said system memory (80) and to write into said cache memory (30) the cache data words of the next subsequent second text row, starting with the first cache data word of said second text row and ending with the last cache data word of said second text row;

means (90, 95) for enabling said writing means (70, 84, 90) immediately after said reading means (72, 86, 90) has read the first cache data word of said first text row in the implementation of the display of the last scan line of said first text row.

2. The circuit of claim 1 wherein:

said reading means (72, 86, 90) requires a first time period for reading each word from the cache memory, and said writing means (70, 84, 90) requires a second time period greater than said first time period.

3. The circuit of claim 2 wherein:

said reading means (72, 86, 90) requires one system clock cycle for reading one word from the cache memory (30) and said writing means (70, 84, 90) requires at least two system clock cycles for writing one word into the cache memory (30) from the system memory (80).

4. A cache circuit (16) for interfacing a system memory (80) responsive to a direct memory access signal to a video display circuit (12) displaying selected characters determined by words stored in the system memory (80) along a text row by writing a plurality of scan lines on the video display screen (19), the interfacing circuit comprising:

a cache memory (30) having simultaneous read and write capabilities, and having a word size greater than the word size of the system memory (80), means for sequentially addressing a plurality of write locations (70, 84) of said cache memory (30), means for sequentially addressing a plurality of read locations (72, 86) of said cache memory (30), means for concatenating a plurality of words from the main memory (80) so that a plurality of words from the main memory (80) are written into the cache memory (30) at a single storage location, and a logic array (90) controlling said cache read means (72, 86) and said cache write means (70, 84) so as to control the writing and reading of words into and from said cache memory (30).

5. The circuit of claim 4 wherein said read address means (72, 86) includes a read counter (86) and a read decoder (72) addressed by said read counter (86), a clock (82) controlling said read counter (86) for addressing successive memory locations of said cache memory (30), said write address means (70, 84) including a write decoder (70) and a write counter (84) controlling the write decoder (70) which addresses selected write locations in said cache memory (30), and said write counter (84) being controlled by said clock (82) and said logic array (90).

6. The circuit of claim 5 which further includes:

second means (74, 96) for storing a word size greater than the word size from said system memory (80) prior to writing a word into said cache memory (30), said second storing means (74, 96) having a word size greater than the word size of said system memory (80), means for switching (90) successive words from the system memory (80) between two portions of the input of said second storing means (74, 96) so that each word in said second storing means (74, 96) is composed of at least a portion of two words of said system memory (80).

7. The circuit of claim 6 wherein said second storing means (74, 96) is in the form of a latch (74) having a word length greater than the word length of the system memory (80), and said second storing means (74, 96) includes a storage buffer (96) selectively controlled by an output of said logic array (90), said storage buffer (96) serving to selectively switch the output of said system memory to selected inputs of said latch (74), said storage buffer (96) being responsive to a signal from said logic array (90).

8. The circuit of claim 7 wherein said video display circuit (12) includes means (34) responsive to each word read from said cache memory (30) for generating a character attribute, a portion of the output word from said cache memory (30) being fed to said character attribute generating means so that the characters displayed by said video display circuit (12) exhibit selected attributes.

9. The circuit of claim 8 wherein said write counter (84) includes a preset input controlled by an output of said logic array (90) so that said write counter (84) is preset to a predetermined count for addressing said cache memory (30) to a predetermined count for addressing said cache memory (30) to a predetermined location, and a write counter (84) includes an enable input (95) controlled by said logic array (90) so that said write counter (84) is selectively advanced under control of said logic array (90).

10. The circuit of claim 9 wherein the output of said read counter (86) is fed to said logic array (90) and said video display circuit (12) includes a scan line counter (40) providing an output signal to said logic array (90) indicative of the scan line of the text row being displayed, said logic array (90) presetting said write counter (84) to a count corresponding to the address of the location of the first character to be written into the cache memory (30) from the system memory (80), and said logic array (90) enables said write counter (84) prior to the start of the last scan line of the currently displayed text row so that the information in the cache memory (30) is updated during the readout of the current text row of the last scan line of the display (18).

11. The circuit of claim 10 wherein said logic array (90) enables said write counter (84) immediately after the readout from the cache memory (30) of the first word in the current text display row and said cache memory (30) is continually updated with the words of the new text row which update is completed prior to the readout of the last word of the new text row during writing of the first scan line of the new text row.

* * * * *